J. M. KROYER.
STEERING MECHANISM FOR TRACTORS.
APPLICATION FILED MAY 21, 1920.

1,387,892.

Patented Aug. 16, 1921.
2 SHEETS—SHEET 1.

INVENTOR
John M. Kroyer
BY
ATTORNEYS

J. M. KROYER.
STEERING MECHANISM FOR TRACTORS.
APPLICATION FILED MAY 21, 1920.

1,387,892.

Patented Aug. 16, 1921.
2 SHEETS—SHEET 2.

*INVENTOR*
John M. Kroyer
BY
*ATTORNEYS*

UNITED STATES PATENT OFFICE.

JOHN MINOR KROYER, OF STOCKTON, CALIFORNIA.

STEERING MECHANISM FOR TRACTORS.

1,387,892.  Specification of Letters Patent.  Patented Aug. 16, 1921.

Application filed May 21, 1920. Serial No. 383,183.

*To all whom it may concern:*

Be it known that I, JOHN MINOR KROYER, a citizen of the United States, and a resident of Stockton, in the county of San Joaquin and State of California, have invented a new and useful Improvement in Steering Mechanism for Tractors, of which the following is a full, clear, and exact description.

My invention relates to improvements in means for steering tractors, and it consists in the combinations, constructions and arrangements herein described and claimed.

An object of my invention is to provide an efficient steering mechanism for that type of tractor set forth in my prior Patent No. 1,308,790. In said prior patent a tractor was disclosed in which the wheels were mounted on rigid axles with cleats or grips secured to the peripheries of the wheels, those grips on one front wheel and the rear wheel on the opposite side being set in angular relation with respect to the axis of the wheel, the grips on the remaining front and rear wheels being oppositely inclined. In said patent it was also set forth that power was applied to all four wheels and that the two wheels on either side of the device could be released, whereby the wheels on the opposite side exerted a turning effect to turn the tractor by a sliding motion.

An object of the present invention is to provide an efficient steering mechanism by means of which the two wheels on one side of the tractor may be simultaneously released, and at the same time a brake applied to the wheels.

A further object of my invention is to provide a steering mechanism in which the movement of the steering wheel will serve to either partially or completely disengage the clutches on either side of the device.

A further object of my invention is to provide a construction in which the subsequent movement of the steering wheel in the same direction will cause the application of the brake.

A further object of my invention is to provide a novel form of cam mechanism for shifting the clutches.

A further object of my invention is to provide a novel form of brake mechanism.

Other objects and advantages will appear in the following specification, and the novel features of the invention will be particularly pointed out in the appended claims.

Figure 2:
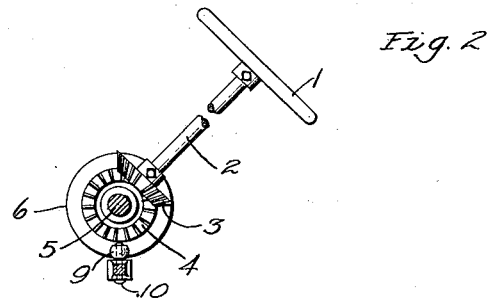
Figure 1:
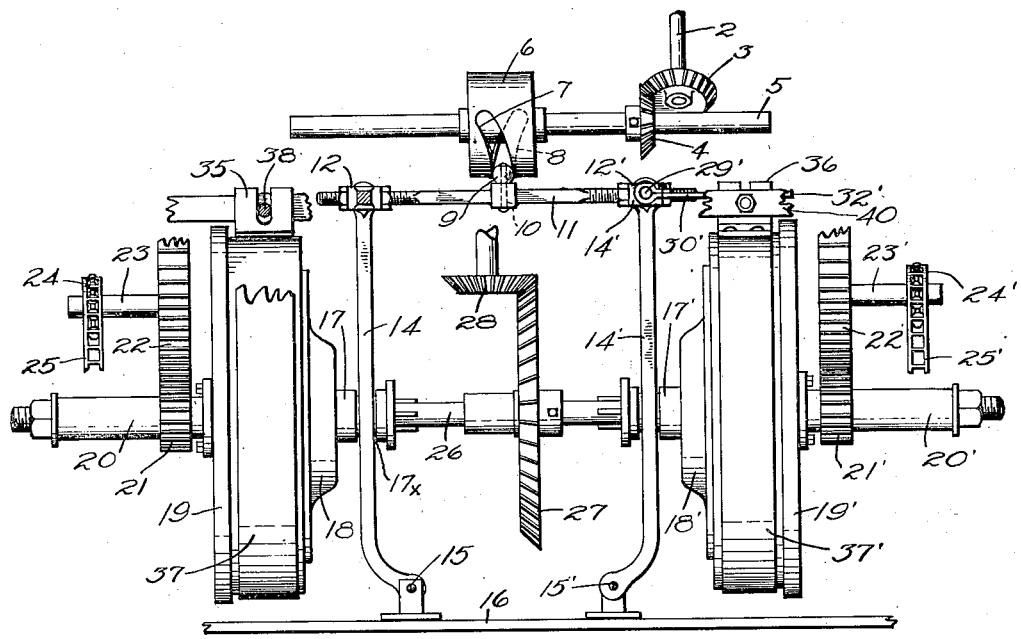
Figure 3:
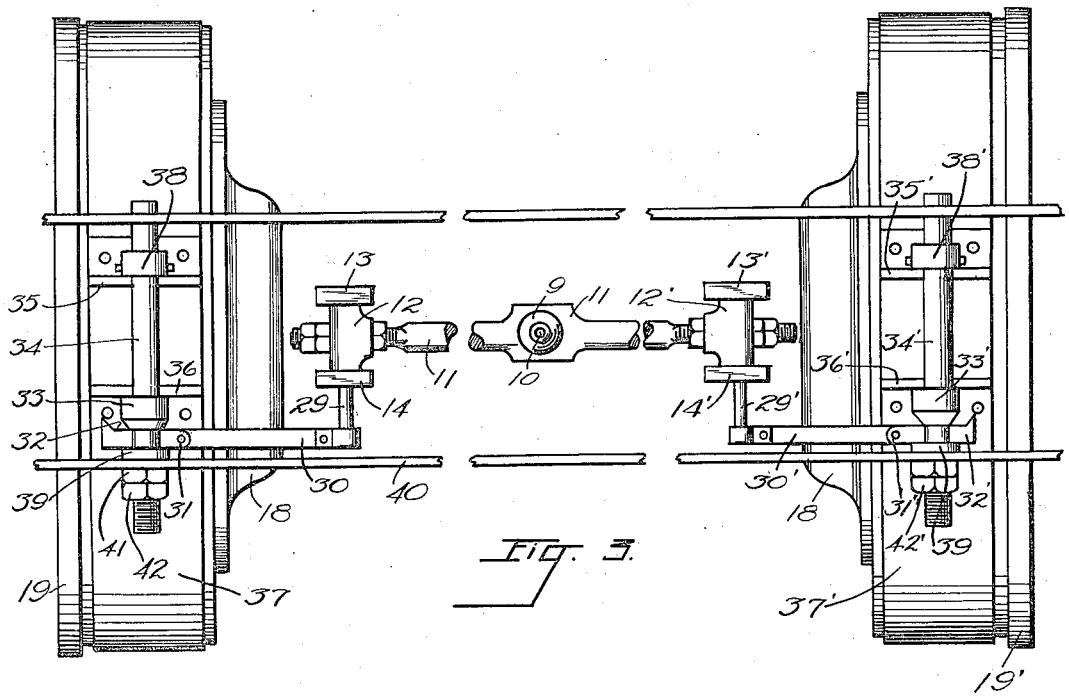
Figure 4:
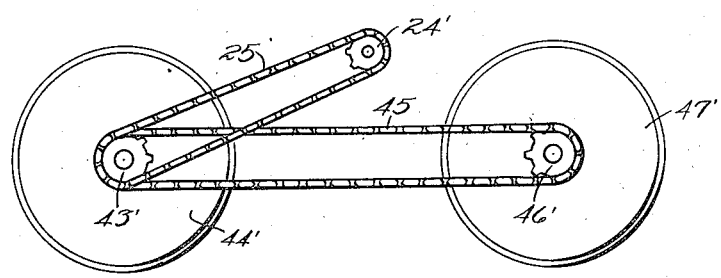

My invention is illustrated in the accompanying drawings, forming part of this application, in which Figure 1 is a side view of the clutch and brake mechanism, certain parts being shown in section, Fig. 2 is a detailed view showing the steering wheel, Fig. 3 is a plan view of a portion of the device, and Fig. 4 is a diagrammatic view showing the means for driving the wheels.

Referring now to Fig. 2, I have shown therein a steering wheel 1 on a rod 2 which bears at its lower end a beveled gear 3 in mesh with a gear 4 on a shaft 5. The latter has secured thereto a cam wheel 6 which has curved cam surfaces 7 and 8 respectively which are arranged to engage a roller 9 on opposite sides thereof. The roller 9 is substantially spherical in shape, being cut off at the top and bottom and being pivotally mounted on a pin 10 carried by a bar 11. The latter is adjustably secured at each end to cross heads 12 and 12'. The cross head 12 is pivotally secured to levers 13 and 14 which are pivotally mounted at 15 on the transmission case wall 16. The levers 13 and 14 pass on opposite sides of the sleeve 17 in a groove $17_x$ carried by the sleeve. The sleeve 17 is connected with the clutch member 18. The latter forms one of the members of a clutch, preferably of the multiple disk type, the opposing clutch member 19 being connected with a hub or sleeve 20 which bears a gear 21 arranged to mesh with a gear 22 on a shaft 23, bearing a sprocket wheel 24 over which a sprocket chain 25 passes. The sleeve 17, bearing the clutch member 18, is slidable on a shaft 26 which is driven through the medium of a gear 27, the latter being driven in turn by a beveled gear 28 from any suitable source of power, as from an internal combustion engine. On the opposite side of the gear 27 are the parts 13' to 25' inclusive which correspond to the parts 13 to 25.

The cross head 12 has an extension 29 to which is secured a rod 30 having pivotally connected thereto a bar 31 with a cam surface 32 arranged to engage a block or head 33 which is slidably disposed on a rod 34. The latter extends through the lugs 35 and 36 on a brake band 37, and is provided with a collar 38 which engages the lug 35. The bar 31 is disposed between the head 33 and the spacing block 39 which bears on the wall 40 of the transmission case. The shaft 34 projects behind the transmission case and is provided with a threaded end having an adjusting nut 41 and a lock nut 42.

On the opposite side are similar members 29' to 42' inclusive which correspond to the parts 29 to 42.

In Fig. 4 I have shown a diagrammatic view in which one of the sprocket wheels, such as the sprocket wheel 24', is shown as connected by means of the sprocket chain 25' with a sprocket 43' on the front wheel 44'. The latter is connected by means of a sprocket chain 45' with a sprocket 46' on one of the rear wheels 47'.

From the foregoing description of the various parts of the device, the operation thereof may be readily understood. The position of the apparatus as shown in Fig. 1 is the normal position, that is to say, when power is being applied to all four wheels. This power, as stated, is applied to the gear 27 which drives the shaft 26. The clutch members of each clutch are held in driving relation by the usual springs (not shown), so that the sprocket 24 on one side and the sprocket 24' on the other side are being driven, and the power is first applied to the front wheel on each side and then to the rear wheel in the manner shown in Fig. 4. If now it is desired to turn the tractor to the right, the wheel 1 is rotated to the right. This will turn the cam member on the shaft 5 (see Fig. 1) so as to bring the cam surface 7 in position to exert lateral pressure on the roller 9 to move the latter to the right in Fig. 1, thus freeing the left hand clutch shown in Fig. 1, but which in reality is the clutch on the right hand side of the machine (Fig. 1 being a figure looking toward the rear of the machine). The sprocket wheel 24 will thus have the power removed therefrom through the disengagement of the clutch and the wheels on the right hand side of the machine corresponding to the wheels 44' and 47' (see Fig. 4) will stop. The power supplied to the wheels 44' and 47' will cause the machine to turn to the right. It is intended that the device shall slide on the wheels from which driving power has been moved, in order to facilitate this sliding motion and prevent the rotation of the wheels which have been disengaged from the driving mechanism, and it is only necessary to turn the steering wheel a little farther in the same direction, whereupon the cam member 32 will engage the beveled end of the head 33 (see Fig. 3) and force the lug 36 of the brake band toward the lug 35, thus applying a brake to the clutch member 19 and thus positively locking the wheels.

With this arrangement only a slight movement of the steering wheel is necessary to free either of the clutches while a slight additional movement will apply the brake. The driver of the tractor operates the steering precisely as he would in steering a wheel, with this exception, however, that he does not have to turn it as far. The arrangement is such that a slight movement will cause a slight releasing of the clutch and the consequent slipping of the same. Since, however, the other side of the tractor is in driving relation with its wheels, the latter will cause a slight turning movement which is increased when the clutch on the opposite side is entirely free.

When the steering wheel is brought back to its neutral position, then both clutches are transmitting movement of the sprocket wheels 24 and 24' through them to the tractor wheels. Since the latter are driven uniformly, the tractor will proceed in a straight line, and will not deviate therefrom, unless the steering wheel is turned regardless of minor obstructions which would turn the wheels of ordinary tractors having steering knuckles and causing the tractor to move out of the straight line. The fact that the brake may be applied or not as desired also adds to the flexibility of the device. If it is desired to make a sharp turn, then the steering wheel is turned to free the clutch on one side and also to set the brake. I have found that the tractor will then turn about its center midway between the wheels and to one side of the tractor, making a device which will turn substantially in its own length.

I claim:

1. In a tractor steering mechanism, a drive shaft, a pair of clutches associated therewith, means connected with each clutch for transmitting power to the wheels on one side of the tractor, a steering wheel, a cam operated by said steering wheel, a lever for disengaging each clutch, a rigid connection between said levers, means carried by said rigid connection and arranged to be moved by said cam, a brake for each clutch, and means connected with said rigid connection for applying the brake through the movement of said rigid connection.

2. In a steering mechanism for tractors, a drive shaft, a clutch disposed at each end of said drive shaft, means associated with each clutch for transmitting power to the wheels on one side of the tractor, a lever associated with each clutch for releasing the same, a rod connecting said levers, a roller carried by the rod, a cam wheel arranged to engage the roller for moving the rod, a steering wheel, and means connecting said steering wheel with said cam to rotate the latter.

3. In a steering mechanism for tractors, a drive shaft, a clutch disposed at each end of said drive shaft, means associated with each clutch for transmitting power to the wheels on one side of the tractor, a lever associated with each clutch for releasing the same, a rod connecting said levers, a roller carried by the rod, a cam wheel arranged to engage the roller for moving the rod, a steering wheel, means connecting said steering wheel with said cam to rotate the latter, a friction band brake associated with each clutch, and means connecting each of said friction band brakes with the rod whereby the brakes are operated.

4. In a steering mechanism for tractors, a drive shaft, a clutch disposed at each end of said drive shaft, means associated with each clutch for transmitting power to the wheels on one side of the tractor, a lever associated with each clutch for releasing the same, a rod connecting the levers, a roller carried by the rod, a cam wheel arranged to engage the roller for moving the rod, a steering wheel, means connecting said steering wheel with said cam to rotate the latter, a friction band brake associated with each clutch, means connecting each of said friction band brakes with the rod whereby the brakes are operated, said last named means comprising a cam, and means associated with the cam for drawing up on the friction band brake during the movement of said rod.

5. In a tractor steering mechanism, a drive shaft, a pair of clutches associated therewith, means operatively connecting each clutch with a wheel of the tractor, a rotatable hand-actuated cam, a lever for disengaging each clutch, and a common and rigid connection between the levers, said connection being adapted to be moved by said cam.

6. In a tractor steering mechanism, a drive shaft, a pair of clutches associated therewith, means operatively connecting each clutch with a wheel of the tractor, a lever for disengaging each clutch, a rigid rod connecting said levers, and hand-actuated means for moving said rod.

7. In a tractor steering mechanism, a drive shaft, a pair of clutches associated therewith, means operatively connecting each clutch with a wheel of the tractor, a lever for disengaging each clutch, a rigid rod connecting said levers, hand actuated means for moving said rod, a friction band brake associated with each clutch, and means connecting each band brake with the rod whereby the brakes are operated, said last named means comprising a cam, and means associated with each cam for drawing up on the band during the movement of the rod in the direction to disengage the corresponding clutch.

8. In a tractor steering mechanism, a drive shaft, a pair of clutches associated therewith, means operatively connecting each clutch with a wheel of the tractor, a lever for disengaging each clutch, a rigid rod connecting said levers, and hand actuated means for moving said rod, a friction band brake associated with each clutch, and means connecting each band brake with the rod whereby the brakes are operated.

JOHN MINOR KROYER.